United States Patent
Polyudov

(10) Patent No.: US 8,135,943 B1
(45) Date of Patent: Mar. 13, 2012

(54) METHOD, APPARATUS, AND COMPUTER-READABLE MEDIUM FOR GENERATING A DISPATCHING FUNCTION

(75) Inventor: Feliks Polyudov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 1152 days.

(21) Appl. No.: 11/273,976

(22) Filed: Nov. 15, 2005

(51) Int. Cl.
  *G06F 9/00* (2006.01)
  *G06F 11/00* (2006.01)
  *G06F 3/00* (2006.01)
(52) U.S. Cl. .................. 713/1; 713/2; 714/36; 719/331; 719/332
(58) Field of Classification Search .................. None
  See application file for complete search history.

(56) References Cited

U.S. PATENT DOCUMENTS

| | | | |
|---|---|---|---|
| 6,487,713 B1 * | 11/2002 | Cohen et al. | 717/105 |
| 7,448,030 B2 * | 11/2008 | Liu et al. | 717/157 |
| 2003/0110415 A1 * | 6/2003 | Podgorsky et al. | 714/36 |
| 2003/0154368 A1 * | 8/2003 | Stevens et al. | 713/1 |
| 2003/0188146 A1 * | 10/2003 | Hale et al. | 713/1 |

* cited by examiner

*Primary Examiner* — Lechi Truong
*Assistant Examiner* — Shih-Wei Kraft
(74) *Attorney, Agent, or Firm* — Hope Baldauff Hartman, LLC

(57) ABSTRACT

The routines to be called by the dispatching function are identified based on the contents of description files associated with the child modules containing the routines to be called. Once the routines to be called by the dispatching function have been identified, an initialization source file is generated that includes source program code for calling each of the identified routines. Once the initialization source file has been generated, the parent program module is built by compiling the individual routines to generate object code and then linking the compiled files to generate the parent program module. The resulting executable parent program module includes the proper calls to execute the identified routines.

14 Claims, 4 Drawing Sheets

METHOD, APPARATUS, AND COMPUTER-READABLE MEDIUM FOR GENERATING A DISPATCHING FUNCTION

TECHNICAL FIELD

The present invention is related to the development of executable program code.

More particularly, the present invention is related to generating a dispatching function in an executable program module in a computer system.

BACKGROUND OF THE INVENTION

In many computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been proposed. The new specification is called the Extensible Firmware Interface ("EFI") specification and is available from INTEL CORPORATION. The EFI specification describes an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

Development of a BIOS or EFI firmware is a complicated and incredibly time consuming process. Historically, a BIOS firmware was developed as a single executable program. However, as the BIOS firmware became more complex, it became necessary to take steps to simplify the BIOS development process. One way in which this was done was by making the development of a BIOS firmware more modular. In particular, the core of the BIOS firmware was separated from a number of independent support modules. For instance, the BIOS firmware core was separated from the modules that provide support for particular vendor hardware. EFI by its very nature is a modular program.

In order for a BIOS or EFI firmware to utilize the services of the modules external to the core, it is necessary for the firmware to call initialization routines in each of the modules. To accomplish this, a dispatching function is created in the core that calls the initialization routines in each of the modules in a specific order. Typically, the dispatching function uses an explicit list of the initialization routines to be called. However, if the list of initialization routines changes, such as in the case of the addition or deletion of a routine to customize the firmware for a particular hardware configuration, the dispatching function must be manually modified to reflect the change. In the case of an extremely complex BIOS or EFI firmware that must be built many times to support a wide variety of hardware configurations, this can be an extremely frustrating and time consuming task for a firmware programmer.

It is with respect to these considerations and others that the various embodiments of the invention have been made.

SUMMARY OF THE INVENTION

In accordance with the present invention, the above and other problems are solved by providing a method, computer-readable medium, and apparatus for generating a dispatching function. Through the embodiments of the invention, one or more routines to be called by a dispatching function are identified, and the dispatching function is created without requiring a programmer to manually specify the routines.

According to one aspect of the invention, a method is provided for generating a dispatching function in a parent computer program module for calling one or more routines in one or more child modules. The parent computer program module may be a BIOS or EFI firmware core, and the child modules may comprise modules for customizing the operation of the firmware, such as for supporting various hardware devices. The routines within the child modules may comprise initialization routines for initializing the operation of each child module. Alternatively, the parent module may comprise any type of computer program wherein it is necessary to call one or more routines provided by other program modules.

According to one method, the routines to be called by the dispatching function are identified based on the contents of description files associated with the child modules containing the routines to be called. A description file is associated with each child module and includes a routine identifier that identifies the routine to be called within the child module and a parent program module identifier that identifies the parent program module. Child modules associated with description files that include a parent program module identifier that corresponds to a current parent program module are identified as being included with the parent program module.

Once the routines to be called by the dispatching function have been identified, an initialization source file is generated that includes source program code for calling each of the identified routines. Generating the initialization source file includes collecting the routine identifier from each identified child module into a list of routines to be executed, generating a macro for producing the initialization source file for calling each routine in the list of routines, and executing the macro to produce the initialization source file. The identifying and generating operations may be performed by a visual development environment. Additionally, the macro may comprise a "makefile" macro utilized by a make utility to build the initialization source file.

Once the initialization source file has been generated, the parent program module is built by linking the initialization source file with the source code of the parent program module. In this manner, the identity of each routine to be called is included in the source code of the parent program module. When the source code of the parent program module is built, therefore, the parent program module is linked with the appropriate child modules. The executable parent program module includes the proper calls to execute the identified routines.

The above-described aspects of the invention may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
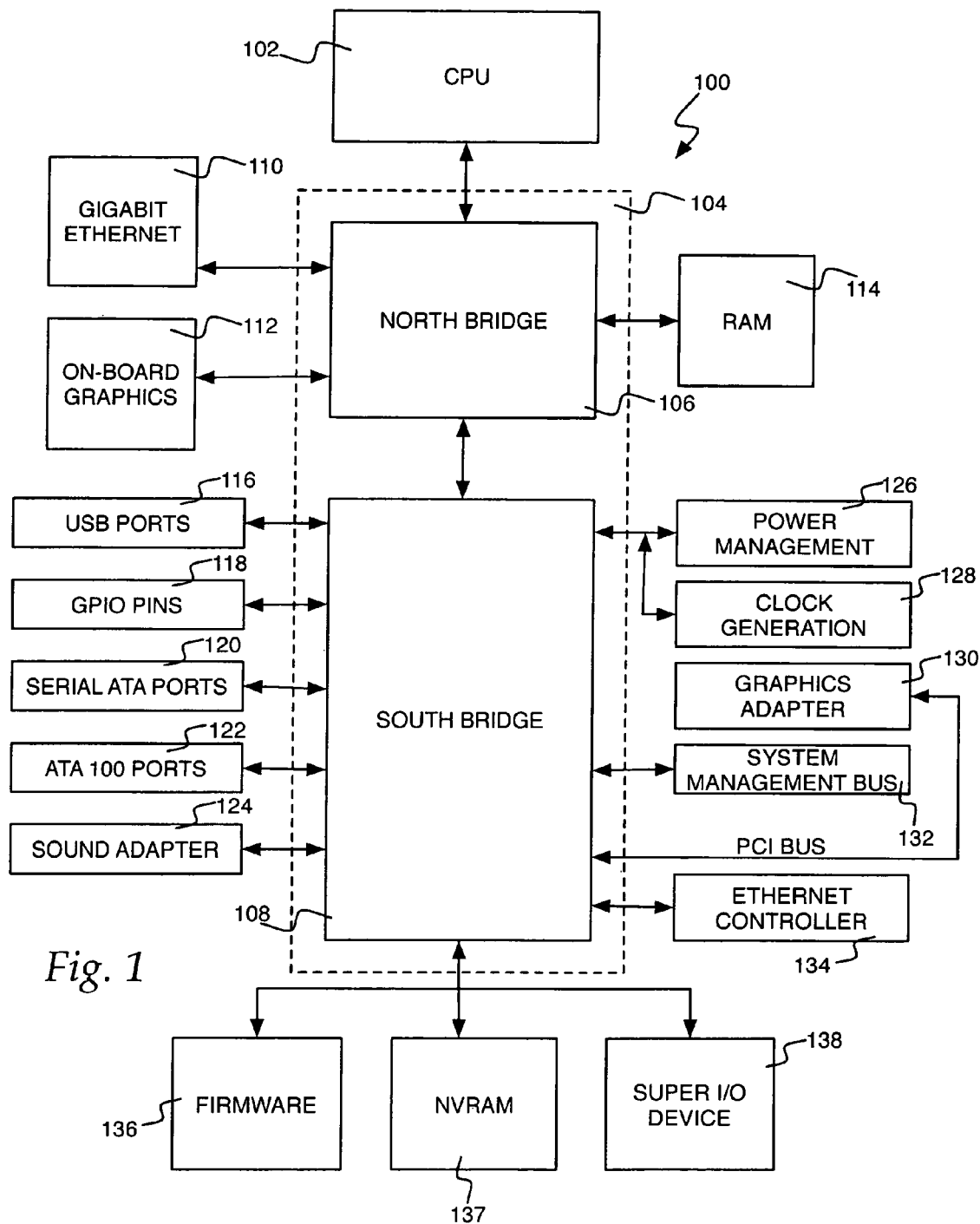
FIG. 1 is a computer architecture diagram showing aspects of a computer architecture utilized in the various embodiments of the invention.

Embodiments of the present invention provide methods, systems, apparatus, and computer-readable media for generating a dispatching function in a parent program module. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with a visual development environment that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments of the present invention will be described. It should be appreciated that although the embodiments of the invention described herein are discussed in the context of a conventional desktop or server computer, the embodiments of the invention may be utilized with virtually any type of computing device. FIG. 1 shows an illustrative computer architecture for a computer 100 that is operative to provide a visual development environment for creating executable computer programs, including programs that include a dispatching function. A dispatching function is a function that calls one or more routines located in the same or other program module.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a graphics adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, the south bridge 108 may include a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a firmware 136, such as an extensible firmware interface ("EFI") firmware or a BIOS firmware that includes program code containing the basic routines that help to start up the computer 100 and to transfer information between elements within the computer 100. The LPC interface may also be utilized to connect a non-volatile random access memory ("NVRAM") 137 to the computer 100. The NVRAM 137 may be utilized by the firmware 136 to store configuration data for the computer 100.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
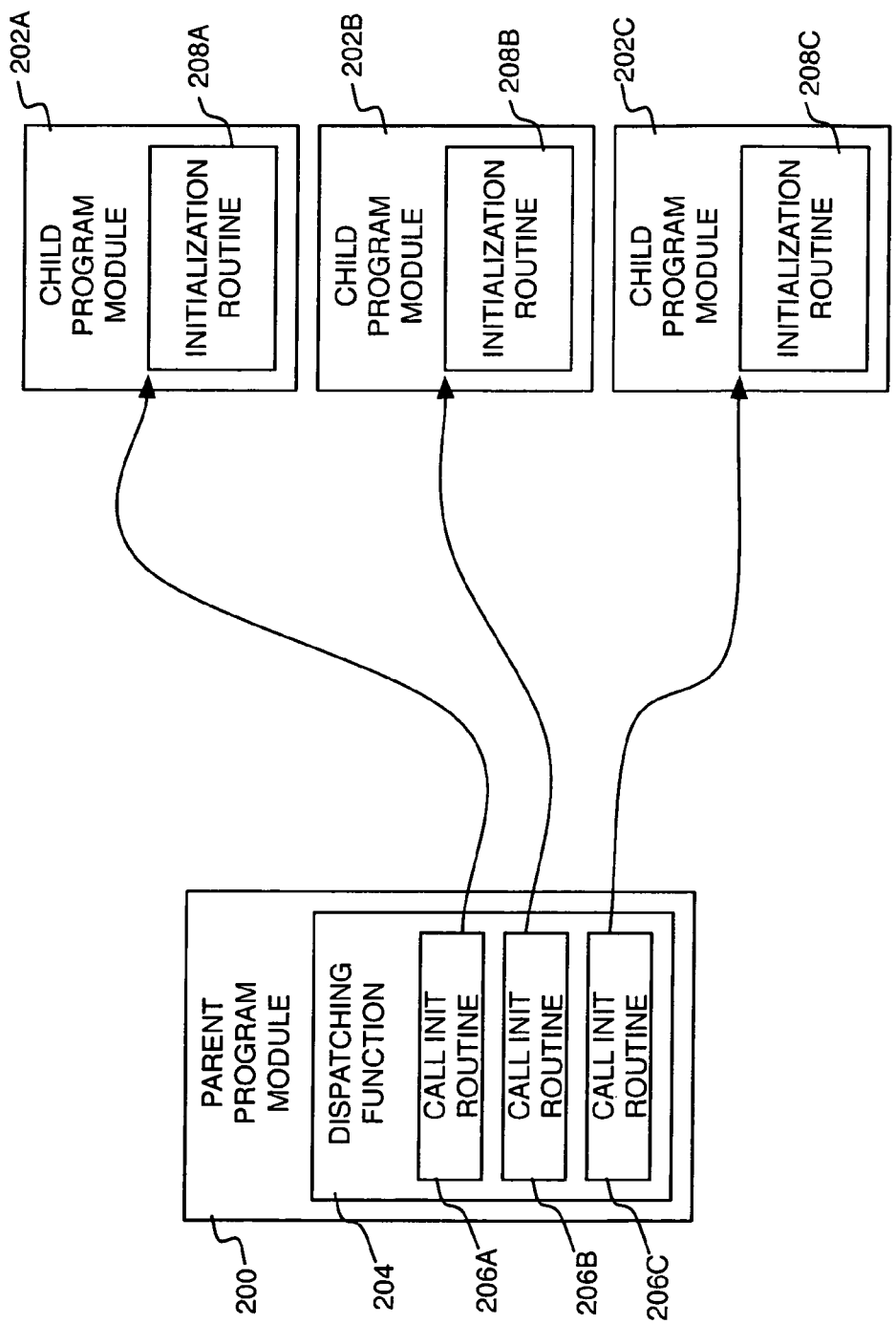
FIG. 2 is a software architecture diagram illustrating the calling of routines in child modules from a parent program module.

Referring now to FIG. 2, additional details will be provided regarding the operation of a dispatching function. As shown in FIG. 2, a parent program module 200 may include a dispatching function 204 for calling routines 208A-208C in the child program modules 202A-202C. In particular, the dispatching function 204 typically includes function calls 206A-206C for calling each of the routines 208A-208C in a particular order.

Figure 3:
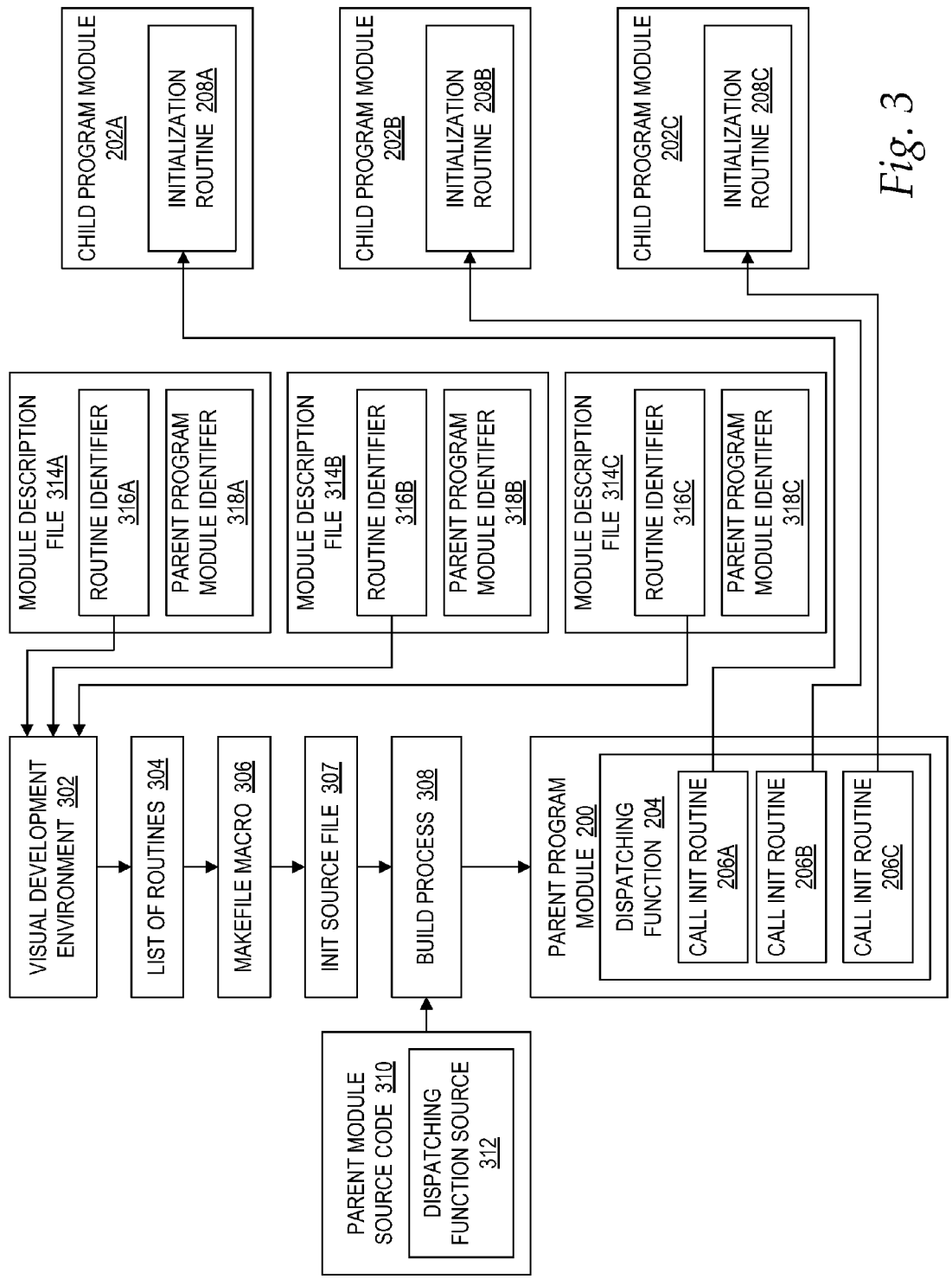
FIG. 3 is a software architecture diagram illustrating aspects of a visual development environment configured to generate a dispatching function in a parent program module for calling routines contained in one or more child modules.
Figure 4:
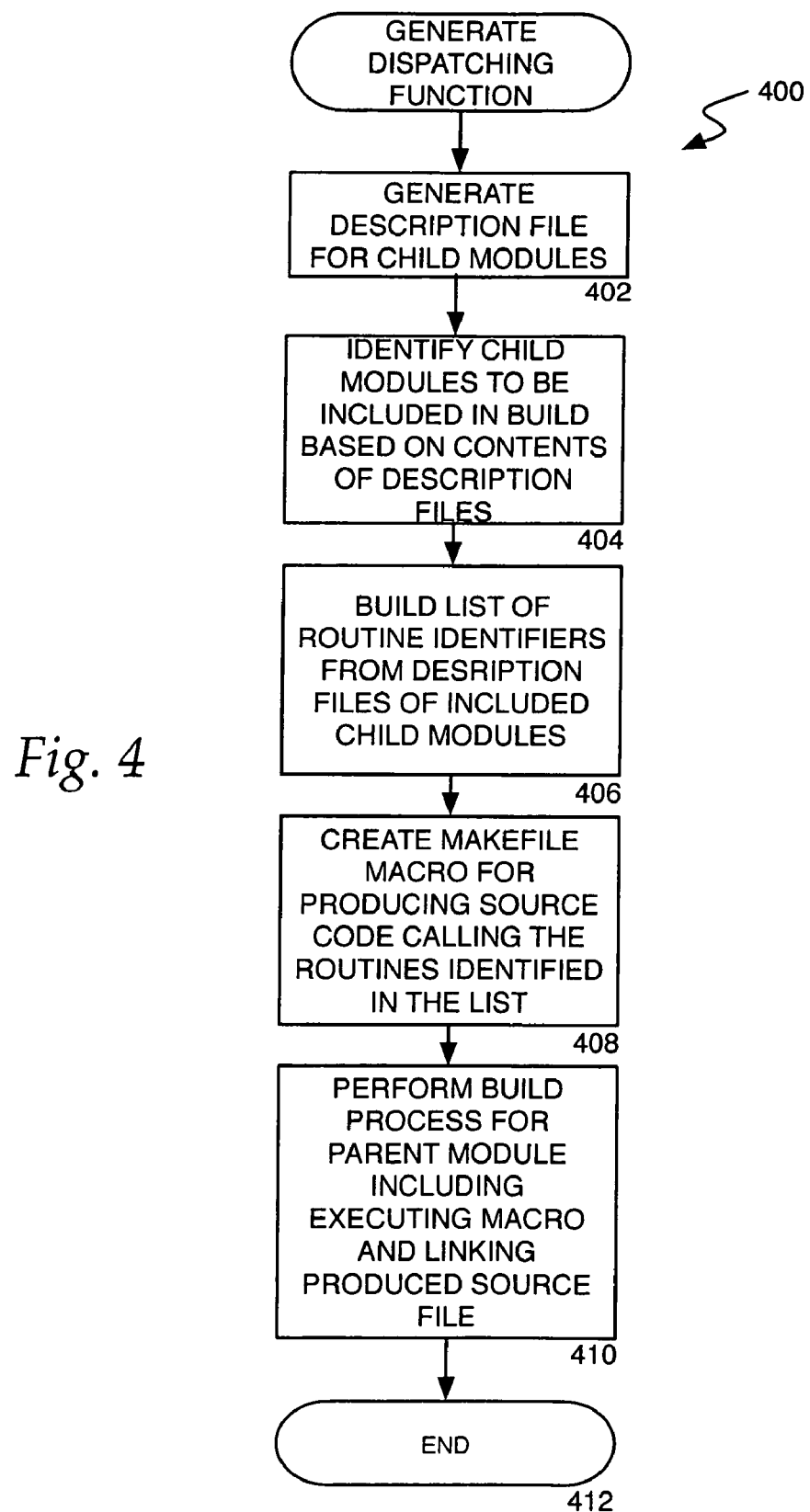
FIG. 4 is a flow diagram showing aspects of various processes provided in the embodiments of the invention for generating a dispatching function.

The function calls 206A-206C have previously been manually coded by the programmer of the parent program module 200. However, as described briefly above, this can be problematic when additional child modules must be added to the parent or when child modules are removed. In these cases, the function calls in the dispatching function 204 must be manually recoded by the programmer. This, however, can be time consuming and frustrating for a programmer, especially where the dispatching function 204 contains calls to many routines and where the parent program module 200 must be frequently rebuilt. FIGS. 3-4 illustrate how the embodiments of the invention generate the dispatching function 204 without requiring that a programmer manually modify the dispatching function 204 when the routines to be included in the dispatching function 204 change.

Referring now to FIG. 3, details will be provided regarding the embodiments of the invention for generating a dispatching function. In particular, FIG. 3 illustrates several software components that are executed by the computer 100 in order to generate a dispatching function 204. The visual development environment 302 is graphical application that enables the creation of software projects from a collection of modules. Through the use of the visual development environment 302, a new project may be created by simply assembling components, such as the modules 202A-202C, from a library of components. The visual development environment 302 also provides the functionality described herein for generating a dispatching function 204. It should be appreciated, however, that the embodiments of the invention are not limited to use within a visual development environment 302, and that other types of development environments may be utilized in conjunction with the embodiments of the invention.

As shown in FIG. 3, a number of child program modules 202A may be utilized in conjunction with a parent program module 200. Each of the child modules 202A-202C includes an initialization routine 208A-208C, respectively, that is called by the dispatching function 204. Other types of routines within the child modules 202A-202C may also be called within the dispatching function 204. Additionally, it should be appreciated that although three child program modules 202A-202C are illustrated in FIG. 3, virtually any number of child modules may be utilized with the embodiments of the present invention.

According to embodiments of the invention, each child program module 202A-202C has an associated module description file 314A-314C. Each module description file 314A-314C contains a routine identifier 316A-316C that identifies the routine to be called from the dispatching function 204. In one embodiment, the routine identifier 316A-316C comprises an identifier for the initialization routine of the corresponding child program module. Each module description file 314A-314C also contains a parent program module identifier 318A-318C that identifies the parent program module that the corresponding child program module should be utilized with. As will be described in greater detail below, the visual development environment 302 utilizes the parent program module identifier 318 to determine which child program modules should be included with the current parent module being built. It should be appreciated that the module description files 314A-314C are expressed using the system description language ("SDL") in one embodiment of the invention. However, other types of languages such as the extensible markup language ("XML") may be utilized to create the module description files 314A-314C.

As will be described in greater detail below with respect to FIG. 4, the visual development environment 302 is operative to examine the parent program module identifiers 318A-318C to identify modules 202A-202C that should be included with the parent program module 200 currently being built. If the parent program module identifier for a particular child program module matches the current parent program module, then the routine identified by the routine identifier is added to the dispatching function 204 in the parent program module. If the parent program module identifier for a child program module does not match the current parent program module, then the routine identified by the routine identifier is not added to the dispatching function 204 in the parent program module. In this manner, only child program modules having data in the corresponding description file identifying the parent program module are included in the build.

Once the visual development environment 302 has identified the module description files 314A-314C that are to be included with the current parent module, the visual development environment 302 creates a list of routines 304. The list of routines 304 includes the data from the routine identifiers 316A-316C of the matching description files 314A-314C. In this manner, a list of routines 304 to be executed from within the dispatching function 204 is generated. The visual development environment 302 then generates a makefile macro 306 for producing an initialization source file 307 that includes source code for calling each of the routines in the list 304. As known to those skilled in the are, "make" is a utility that automates the process of converting files from one form to another, doing dependency tracking and invoking external programs to do additional work as necessary. The make utility is used most frequently for compiling source code into object code, joining and then linking object code into executables. The Make utility uses "makefiles" to determine the dependency graph for a given output and the build scripts that need to be passed to the shell to build them. Makefile macros may also be utilized by a compiler to facilitate the creation of source code.

When the makefile macro 306 is executed during the build process 308, the initialization source file 307 is generated. The initialization source file 307 includes program code to build an array of initialization routines retrieved from the external makefile macro 306, and program code to call every function in the array. The parent module source code 310 comprises the source code for the executable parent program module 200. The parent module source code 310 includes invocation of the program code to call every function in the array of initialization routines retrieved from the external initialization source file 307. Accordingly, when the parent module source code 310 is linked with the initialization source file 307, the appropriate function calls 206A-206C are created in the dispatching function 204. In this manner, when compiled, the parent module source code 310 results in an executable parent program module 200 that calls all of the routines 208A-208C necessary for the operation of the parent.

It should be appreciate that, according to embodiments of the invention, the parent program module 200 comprises a BIOS firmware program. Alternatively, the parent program module 200 may comprise a firmware compatible with the EFI specification. Each of the child program modules 202A-202C may provide support functionality to a core firmware program.

Turning now to FIG. 4, an illustrative routine 400 will be described illustrating the operation of the computer 100 and the visual development environment 302 for generating a dispatching function according to one embodiment of the invention.

It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIG. 4, and making up the embodiments of the present invention described herein, are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 400 begins at operation 402, where the description files 314A-314C are generated for each of the child modules 202A-202C. In particular, the routine identifier 316A that identifies the routine to be called from the dispatching function 204 and the parent program module identifier 318A-318C are specified for each child program module. From operation 402, the routine 400 continues to operation 404, where the visual development environment 302 identifies the child modules 202A-202C to be included in the build of the current parent program module 200 based on the contents of the description files 314A-314C. As described above, if the parent program module identifier for a particular child program module matches the current parent program module, then the routine identified by the routine identifier is added to the dispatching function 204 in the parent program module.

From operation 404, the routine 400 continues to operation 406, where the visual development environment 302 creates a list of routines 304 that includes the routine identifiers for each of the child program modules 202A-202C that are to be included in the build of the parent program module 200. The routine 400 then continues to operation 408, where the visual development environment 302 creates the makefile macro 306 for producing the initialization source file 307 that includes code for calling each of the routines identified in the list 304.

Once the makefile macro 306 has been generated, the routine 400 continues to operation 410, where the build process 308 is performed. The build process 308 includes executing the makefile macro 306 to produce the initialization source file 307. The initialization source file 307 and the parent module source code 310 are compiled and then linked, thereby producing the executable parent program module 200, that includes calls 206A-206C to each of the routines 208A-208C. Once the build process 308 has completed, the routine 400 continues to operation 412, where it ends.

It will be appreciated that embodiments of the present invention provide methods, systems, apparatus, and computer-readable medium for generating a dispatching function. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for generating a dispatching function in an executable parent program module, the method comprising computer-implemented operations for:

generating, through a computer comprising a processor and a memory coupled to the processor, a first description file, a second description file, and a third description file, the first description file comprising a first routine identifier identifying a first initialization routine to be called by a first dispatching function and a first parent program module identifier identifying an executable first parent program module, the executable first parent program module comprising the first dispatching function, the second description file comprising a second routine identifier identifying a second initialization routine to be called by the first dispatching function after calling the first initialization routine and a second parent program module identifier identifying the executable first parent program module, the third description file comprising a third routine identifier identifying a third initialization routine to be called by a second dispatching function and a third parent program module identifier identifying an executable second parent program module, the executable second parent program module comprising the second dispatching function, the executable first parent program module comprising a firmware, the first initialization routine and the second initialization routine comprising routines for customizing operation of the firmware;

determining, through the computer, whether the first parent program module identifier matches the executable first parent program module;

in response to determining that the first parent program module identifier matches the executable first parent program module, adding, through the computer, a first call to the first initialization routine to the first dispatching function;

determining, through the computer, whether the second parent program module identifier matches the executable first parent program module;

in response to determining that the second parent program module identifier matches the executable first parent program module, adding, through the computer, a second call to the second initialization routine to the first dispatching function;

determining, through the computer, whether the third parent program module identifier matches the executable first parent program module;

in response to determining that the third parent program module identifier does not match the executable first parent program module, omitting, through the computer, a third call to the third initialization routine from the first dispatching function;

building, through the computer, a list of routine identifiers containing the first routine identifier from the first description file and the second routine identifier from the second description file, the first routine identifier identifying the first initialization routine to be called by the first dispatching function and the second routine identifier identifying the second initialization to be called by the first dispatching function;

executing, through the computer, a makefile macro to generate an initialization source file comprising program code configured to call the first initialization routine and the second initialization corresponding to the first routine identifier and the second routine identifier in the list of routine identifiers;

compiling, through the computer, the initialization source file;

compiling, through the computer, program code for the executable first parent program module; and linking, through the computer, the compiled initialization source file and the compiled program code for the executable first parent program module to generate the executable first parent program module containing the first dispatching function configured to call the first initialization routine and the second initialization corresponding to the first routine identifier and the second routine identifier in the list of routine identifiers.

2. The computer-implemented method of claim 1, wherein executing, through the computer, a makefile macro to generate an initialization source file comprising program code configured to call the first initialization routine and the second initialization corresponding to the first routine identifier and the second routine identifier in the list of routine identifiers comprises:

generating, through the computer, the makefile macro, the makefile macro configured to be executed to generate the initialization source file comprising program code configured to call the first routine identifier and the second routine identifier from the list of routine identifiers.

3. The computer-implemented method of claim 2, wherein generating operations are performed by a visual development environment.

4. The computer-implemented method of claim 2, wherein the executable first parent program module comprises a computer basic input and output system (BIOS) firmware program.

5. The computer-implemented method of claim 2, wherein the executable first parent program module comprises an extensible firmware interface firmware program.

6. A computer-controlled apparatus configured to perform the method of claim 1.

7. A computer-readable storage medium having computer-readable instructions stored thereon which, when executed by a computer, cause the computer to perform the method of claim 1.

8. A computer-implemented method for generating a dispatching function in an executable parent program module, the method comprising computer-implemented operations for:

generating, through a computer comprising a processor and a memory coupled to the processor, a first description file, a second description file, and a third description file, the first description file comprising a first routine identifier identifying a first initialization routine to be called by a first dispatching function and a first parent program module identifier identifying an executable first parent program module, the executable first parent program module comprising the first dispatching function, the second description file comprising a second routine identifier identifying a second initialization routine to be called by the first dispatching function after calling the first initialization routine and a second parent program module identifier identifying the executable first parent program module, the third description file comprising a third routine identifier identifying a third initialization routine to be called by a second dispatching function and a third parent program module identifier identifying an executable second parent program module, the executable second parent program module comprising the second dispatching function, the executable first parent program module comprising a firmware, the first initialization routine and the second initialization routine comprising routines for customizing operation of the firmware;

determining, through the computer, whether the first parent program module identifier matches the executable first parent program module;

in response to determining that the first parent program module identifier matches the executable first parent program module, adding, through the computer, a first call to the first initialization routine to the first dispatching function;

determining, through the computer, whether the second parent program module identifier matches the executable first parent program module;

in response to determining that the second parent program module identifier matches the executable first parent program module, adding, through the computer, a second call to the second initialization routine to the first dispatching function;

determining, through the computer, whether the third parent program module identifier matches the executable first parent program module;

in response to determining that the third parent program module identifier does not match the executable first parent program module, omitting, through the computer, a third call to the third initialization routine from the first dispatching function;

building, through the computer, a list of routine identifiers containing the first routine identifier from the first description file and the second routine identifier from the second description file, the first routine identifier identifying the first initialization routine to be called by the first dispatching function and the second routine identifier identifying the second initialization to be called by the first dispatching function;

generating, through the computer, a makefile macro configured to produce an initialization source file comprising source code for calling the first initialization routine and the second initialization corresponding to the first routine identifier and the second routine identifier in the list of routine identifiers in a specified order where the second initialization routine is executed after the first initialization routine;

executing, through the computer, the makefile macro to produce the initialization source file;

compiling, through the computer, the initialization source file;

compiling, through the computer, program code for the executable first parent program module; and linking, through the computer, the compiled initialization source file and the compiled program code for the executable first parent module to generate the executable first parent program module containing the first dispatching function configured to call the first initialization routine and the second initialization corresponding to the first routine identifier and the second routine identifier in the list of routine identifiers in the specified order.

9. The computer-implemented method of claim 8, wherein the determining and generating operations are performed by a visual development environment.

10. The computer-implemented method of claim 8, wherein the executable first parent program module comprises a computer basic input and output system (BIOS) firmware program.

11. The computer-implemented method of claim 10, wherein the executable second parent program module comprises an extensible firmware interface firmware program.

12. A computer-controlled apparatus capable of performing the method of claim 8.

13. A computer-readable storage medium having computer-readable instructions stored thereon which, when executed by a computer, cause the computer to perform the method of claim 8.

14. A computer system for generating a dispatching function in an executable parent program module, the system comprising: a processor; a memory coupled to the processor;

a first child program module comprising a first initialization routine to be called by a first dispatching function and configured to initialize a first child program module;

a second child program module comprising a second initialization routine to be called by the first dispatching function and configured to initialize a second child program module;

a third child program module comprising a third initialization routine to be called by a second dispatching function and configured to initialize a third child program module;

a first description file comprising a first routine identifier identifying the first initialization routine to be called by the first dispatching function and a first parent program module identifier identifying an executable first parent program module, the executable first parent program module comprising the first dispatching function, the executable first parent program module including a computer basic input and output system (BIOS) firmware program, the first child program module and the second child program module configured to customize operation of the computer BIOS firmware program;

a second description file comprising a second routine identifier identifying the second initialization routine to be called by the first dispatching function after calling the first initialization routine and a second parent program module identifier identifying the executable first parent program module;

a third description file comprising a third routine identifier identifying the third initialization routine to be called by the second dispatching function and a third parent program module identifier identifying an executable second parent program module, the executable second parent program module comprising the second dispatching function, the executable second parent program module comprising an Extensible Firmware Interface (EFI) firmware program, third child program module configured to customize operation of the EFI firmware program;

a parent module source code comprising source code for the executable first parent program module; and a visual development environment (i) which executes in the processor from the memory and (ii) which, when executed by the processor, causes the computer system to generate the dispatching function in the executable parent program module by determining whether the first parent program module identifier matches the executable first parent program module, in response to determining that the first parent program module identifier matches the executable first parent program module, adding a first call to the first initialization routine to the first dispatching function, determining whether the second parent program module identifier matches the executable first parent program module, in response to determining that the second parent program module identifier matches the executable first parent program module, adding a second call to the second initialization routine to the first dispatching function, determining whether the third parent program module identifier matches the executable first parent program module, in response to determining that the third parent program module identifier does not match the executable first parent program module, omitting a third call to the third initialization routine from the first dispatching function, building a list of routine identifiers containing first routine identifier from the first description file and the second routine identifier from the second description file, the first routine identifier identifying the first initialization routine to be called by the first dispatching function and the second routine identifier identifying the second initialization to be called by the first dispatching function, generating a makefile macro, the makefile macro configured to be executed to generate an initialization source file comprising program code configured to call the first initialization routine and the second initialization corresponding to the first routine identifier and the second routine identifier in the list of routine identifiers in a specified order where the second initialization routine is executed after the first initialization routine, executing the makefile macro to produce the initialization source file, compiling the initialization source file, compiling the parent module source code, and linking the compiled initialization source file and the compiled parent module source code for the executable first parent module to generate the first dispatching function configured to call the first initialization routine and the second initialization corresponding to the first routine identifier and the second routine identifier in the list of routine identifiers in the specified order.

\* \* \* \* \*